United States Patent
Allen

(10) Patent No.: US 6,263,166 B1
(45) Date of Patent: Jul. 17, 2001

(54) EXPOSURE COUNT INDICATOR FOR CAMERA

(75) Inventor: Loretta E. Allen, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/443,900

(22) Filed: Nov. 19, 1999

(51) Int. Cl.[7] .............................. G03B 1/66; G01D 13/04; G02B 5/22; G02B 27/02

(52) U.S. Cl. .................... 396/284; 116/213; 116/298; 116/302; 359/436; 359/889; 359/890

(58) Field of Search ...................... 396/284, 281; 116/298, 318, 302, 317, 213; 359/436, 890, 887, 892, 885, 889

(56) References Cited

U.S. PATENT DOCUMENTS

| | | | |
|---|---|---|---|
| 1,218,082 | 3/1917 | Hall | 40/443 |
| 1,285,753 | 11/1918 | Lowenstein | 352/81 |
| 1,422,527 | 7/1922 | Berger | 359/464 |
| 2,548,530 | 4/1951 | Harvey | 396/396 |
| 2,588,054 | 3/1952 | Smith | 396/388 |
| 2,619,932 | 12/1952 | Brewster | 116/257 |
| 2,621,866 | 12/1952 | Harvey | 396/396 |
| 2,652,209 | 9/1953 | Hodges | 396/396 |
| 2,792,744 | 5/1957 | Hirsch | 356/419 |
| 2,917,981 | * 12/1959 | Sewig | 396/284 X |
| 3,166,672 | * 1/1965 | Gardner | 359/889 X |
| 3,174,231 | * 3/1965 | Schure | 359/889 X |
| 3,248,050 | * 4/1966 | Dickson | 359/890 |
| 3,388,490 | 6/1968 | Stechemesser | 40/406 |
| 4,268,150 | 5/1981 | Chen | 396/284 X |
| 5,005,035 | 4/1991 | Pagano | 396/284 X |
| 5,832,322 | 11/1998 | Zawodny et al. | 396/284 |

* cited by examiner

Primary Examiner—W. B. Perkey
(74) Attorney, Agent, or Firm—Roger A. Fields

(57) ABSTRACT

A camera has a rear cover part, and a rotatable counter dial with a numerical scale of exposure count indicia to be successively viewed. Each of the indicia has the same color. A label on the rear cover part is superimposed to the counter dial and has the same color as the indicia to render the indicia invisible in order to prevent them from being viewed. The label includes a viewing portion that is not the same color as the indicia and is arranged to be superimposed successively to the indicia when the counter dial is rotated. As a result, the indicia are made successively visible in order to permit them to be successively viewed. Eye-readable information is imprinted on the label, and the counter dial is transparent to permit the information to be visible through the counter dial in order to be read.

8 Claims, 2 Drawing Sheets

EXPOSURE COUNT INDICATOR FOR CAMERA

CROSS REFERENCE TO RELATED APPLICATION

Reference is made to commonly assigned copending application Ser. No. 09/443,517, entitled EXPOSURE COUNT INDICATOR FOR CAMERA and filed Nov. 19, 1999 in the name of Loretta E. Allen.

FIELD OF THE INVENTION

The invention relates generally to the field of photography, and in particular to an exposure count indicator for a camera.

BACKGROUND OF THE INVENTION

Practically every camera that is available today includes an exposure count indicator. Typically, the exposure count indicator provides a visible indication of the number of frames that remain available to be exposed on a filmstrip in the camera, i.e. the current number of exposures that can be made on the filmstrip. Conversely, the exposure count indicator can provide a visible indication of the number of frames actually exposed on the filmstrip, i.e. the number of exposures actually made In either case, the exposure count indicator includes a numerical scale of successive exposure count indicia that are evenly spaced from one another. The scale of indicia range from the number "1" which indicates either that only one frame remains available to be exposed on the filmstrip, or only one frame has been actually exposed, to a higher number which is the maximum number of exposures, for example "15", "24" or "40". See prior art U.S. Pat. No. 5,832,322 issued Nov. 3, 1998.

THE CROSS-REFERENCED APPLICATION

The cross-referenced application discloses a camera having a rear cover part, a label on the rear cover part, and a numerical scale of exposure count indicia to be successively viewed. The numerical scale of exposure count indicia is located on the label, and each of the indicia has the same color. A color-absorbing optical filter is rotatable superimposed to the indicia and is a color that absorbs the color of the indicia to render the indicia invisible in order to prevent them from being viewed through the filter when light is reflected from the indicia to the filter. The filter includes a viewing portion that is arranged to be superimposed successively to the indicia when the filter is rotated and does not absorb the color of the indicia As a result, the indicia are successively visible through the viewing portion in order to permit them to be successively viewed. Eye-readable information on the label is a color that is transmitted through the filter to permit the information to be read when light is reflected from the information to the filter.

SUMMARY OF THE INVENTION

An exposure count indicator comprising a numerical scale of exposure count indicia to be successively viewed, is characterized in that:

each of the indicia has the same color;
a concealer is superimposed to the indicia and has the same color as the indicia to render the indicia invisible in order to prevent them from being viewed, and includes a viewing portion that is not the same color as the indicia to allow only one of the indicia which is superimposed to said viewing portion to be visible in order to permit that indicia to be viewed; and the indicia and the concealer are supported for movement of one relative to the other for the indicia to be successively superimposed to the viewing portion, whereby the indicia can be successively viewed.

Preferably, the concealer includes eye-readable information, and a counter dial which includes the indicia is transparent to permit the information to be visible through the counter dial in order to be read.

DETAILED DESCRIPTION OF THE INVENTION

The invention is disclosed as being embodied preferably in so-called a one-time-use or single-use disposable camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
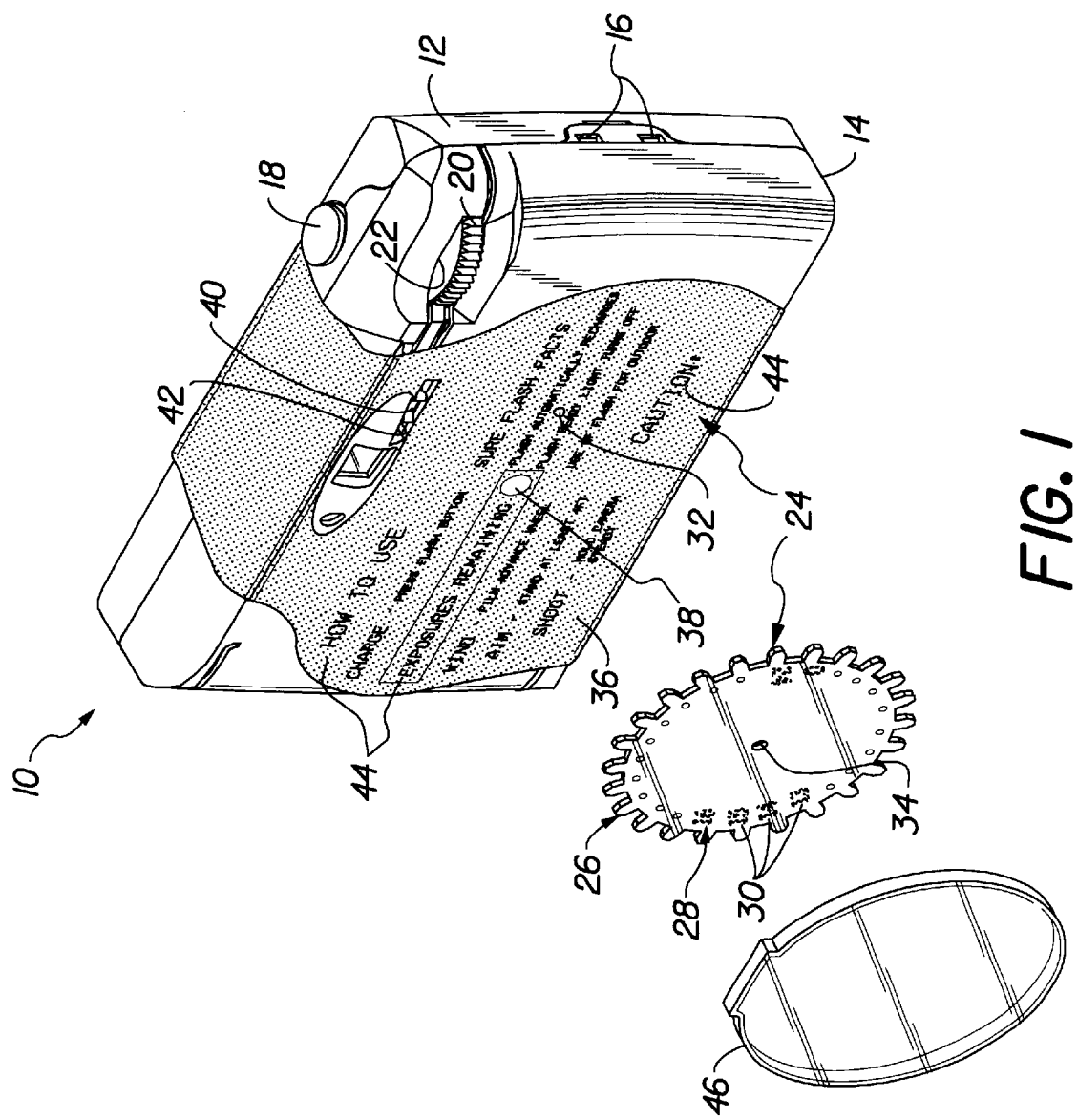
FIG. 1 is an exploded rear perspective view of a camera with an exposure count indicator according to a preferred embodiment of the invention.
Figure 2:
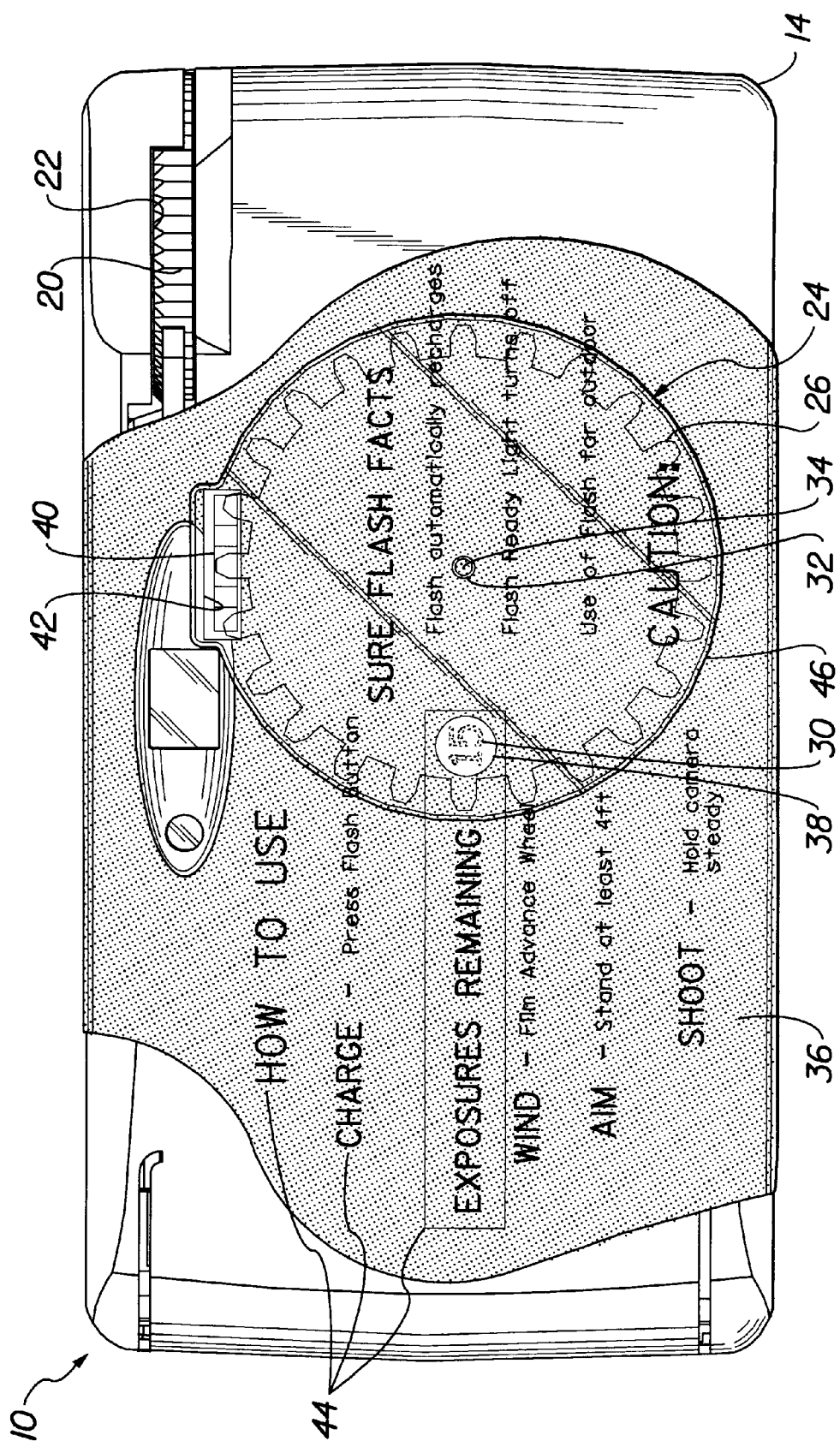
FIG. 2 is a rear elevation view of the camera.

Referring now to the drawings, FIGS. 1 and 2 show a one-time-use camera 10. The one-time-use camera 10 includes a plastic opaque main body part (not shown), a plastic opaque front cover part 12, and a plastic opaque rear cover part 14. The term "opaque" is used in the conventional sense as defined in the dictionary, i.e. "not pervious to light". The front cover part 12 and the rear cover part 14 house the main body part between them and are connected releasably to one another and to the main body part via known flexible hook-in-hole connections 16.

As is well known, the main body part has a rearwardly open cartridge receiving chamber for a conventional film cartridge and a rearwardly open film supply chamber for an unexposed filmstrip. The unexposed filmstrip, except for a trailing end portion in the film cartridge, is wound into an unexposed film roll on a rotatable film supply spool in the film supply chamber. A rearwardly open, rectangular-shaped backframe (exposure) opening is located intermediate the cartridge receiving chamber and the film supply chamber for exposing successive frames of the filmstrip. This exposure is initiated by manually depressing a release button 18, which causes a shutter to be opened in order to allow ambient light to be received through a front taking lens on the main body part. A manual film winder or film winding thumbwheel 20, rotatably supported on the main body part, above the cartridge receiving chamber, radially protrudes partially from an elongate narrow opening 22 in the rear cover part 14 and has a depending coaxial stem (not shown) in coaxial engagement with an exposed top end of a film take-up spool inside the film cartridge in the cartridge receiving chamber. The film winding thumbwheel 20 is manually grasped or fingered to rotate the thumbwheel in a film winding direction, counter-clockwise in FIGS. 1 and 2, to similarly rotate the film take-up spool inside the film cartridge. This is done in order to wind an exposed frame of the filmstrip from the backframe opening into the film cartridge and to move a fresh unexposed frame of the filmstrip from the unexposed film roll on the film supply spool in the film supply chamber to the backframe opening. The rewinding movement of the filmstrip the equivalent of slightly more than one frame width of the filmstrip rotates a metering sprocket in engagement with successive perforations in the filmstrip to pivot a metering lever into engagement with the thumbwheel 20 in order to prevent further manual rotation of the thumbwheel. Manually depressing the release button 18 to expose one of the frames pivots the metering lever out of engagement with the thumbwheel 20 to then permit renewed rotation of the thumbwheel.

An exposure count indicator 24 for providing a visible indication of the number of frames that remain to be exposed on the filmstrip is shown in FIGS. 1 and 2.

The exposure count indicator 24 includes a peripherally toothed counter dial or disk 26 having a numerical scale 28 of successive exposure count indicia 30 that are evenly spaced from one another in a circle and range from the number "24 to the number "0". The counter dial 26 is rotatably supported on a fixed pin 32 that projects from the rear cover part 14 into a center bearing hole 34 in the counter dial. Placing the counter dial 26 on the rear cover part 14, facing rearward, makes it easy to view the indicia 30. Further advantages of this placement are described in prior art U.S. Pat. No. 5,832,322.

The counter dial 26 is transparent and colorless. Each of the indicia 30 has exactly the same color (same hue, brightness, lightness and saturation), for example yellow, and like the counter dial 26 are transparent. The term "transparent" is used in the conventional sense as defined in a dictionary, i.e. "having the property of transmitting light without appreciable scattering so that bodies beyond are entirely visible".

A label 36 is fixed to the rear cover part 14, to be superimposed to (beneath) the counter dial 26, and is opaque, i.e. not pervious to light. The label 36 has exactly the same color (same hue, brightness, lightness and saturation), for example yellow, as the indicia 30. This sameness of color between the indicia 30 and the label 36 renders the indicia invisible to prevent them from being viewed when looking at the counter dial 26. Thus, the label 36 can be referred to as a "concealer".

The label 36 has a small viewing portion 38 which is white. The term "white" is used in the conventional sense as defined in the dictionary, i.e. "the achromatic object color of greatest lightness characteristically perceived to belong to objects that reflect diffusely nearly all light throughout the visible spectrum".

A peripherally toothed sprocket wheel 40 rotatably supported on the main body part, above the backframe (exposure)opening in the main body part, radially protrudes partially from an elongate narrow opening 42 in the rear cover part 14 to rotationally engage the counter dial 26. The sprocket wheel 40 is slightly rotated via known suitable gearing (not shown) in response to incremental film movement within the main body part. Each time the thumbwheel 20 is manually rotated in the film winding direction, counter-clockwise in FIGS. 1 and 2, to wind an exposed frame of the filmstrip from the backframe opening into the film cartridge in the cartridge receiving chamber in the main body part and to move a fresh unexposed frame of the filmstrip from the unexposed film roll on the film supply spool in the film supply chamber in the main body part to the backframe opening, the counter dial 26 is rotated clockwise in FIGS. 1 and 2, via the sprocket wheel 40, to move the next lower one of the indicia 30 over the viewing portion 38. The indicia, shown in FIG. 2 as the number "15", that is then superimposed to the viewing portion 38 is rendered visible to permit it to be viewed. This is because the viewing portion 38 is white rather than yellow.

Alternatively, the counter dial 26 can be rotated as disclosed in prior art U.S. Pat. No. 5,832,322

The label 36 includes various eye-readable information 44 that is black. The term "black" is used in the conventional sense as defined in the dictionary, i.e. "the achromatic color of least lightness characteristically perceived to belong to objects that neither reflect not transmit light". Since the counter dial 26 and the indicia 30 are transparent and the information 44 is black, the information is visible through the counter dial including the indicia in order to for the information to be read.

A protective cover 46 which is transparent and colorless is fixed to the rear cover part 14 over the counter dial 26 as shown in FIGS. 1 and 2.

The invention has been described with reference to a preferred embodiment. However, it will be appreciated that variations and modifications can be effected by a person of ordinary skill in the art without departing from the scope of the invention. For example, the label 36 can be discarded and in its place the protective cover 46 instead of being colorless can be exactly the same color, yellow, as the indicia 30. In this instance, a small colorless window would be provided in the protective cover 46 in place of the viewing portion 38 on the label 36. Also, instead of the counter dial 26 being rotatable, the protective cover 46 can be made rotatable.

PARTS LIST

- 10. one-time-use camera
- 12. front cover part
- 14. rear cover part
- 16. hook-in-hole connection
- 18. release button
- 20. film winding thumbwheel
- 22. elongate narrow opening
- 24. exposure count indicator
- 26. counter dial
- 28. numerical scale
- 30. indicia
- 32. fixed pin
- 34. center bearing hole
- 36. label or concealer
- 38. viewing portion
- 40. sprocket wheel
- 42. elongate narrow opening
- 44. eye-readable information
- 46. protective cover

What is claimed is:

1. An exposure count indicator comprising a numerical scale of exposure count indicia to be successively viewed, is characterized in that:

each of said indicia has the same color;

a concealer is superimposed to said indicia and has the same color as the indicia to render the indicia invisible in order to prevent them from being viewed, and includes a viewing portion that is not the same color as said indicia to allow only one of the indicia which is superimposed to said viewing portion to be visible in order to permit that indicia to be viewed; and said indicia and said concealer are supported for movement of one relative to the other for said indicia to be successively superimposed to said viewing portion, whereby said indicia can be successively viewed.

2. An exposure count indicator as recited in claim 1, wherein said concealer includes eye-readable information, and a counter dial which includes said indicia is transparent to permit said information to be visible through the counter dial in order to be read.

3. An exposure count indicator as recited in claim 2, wherein said counter dial except for said indicia is colorless.

4. An exposure count indicator as recited in claim 2, wherein said indicia are transparent, and said information is not the same color as said indicia to be visible through the indicia.

5. An exposure count indicator as recited in claim 4, wherein said information is black to not reflect all incident light.

6. An exposure count indicator as recited in claim 1, wherein said viewing portion is white to reflect diffusely all incident light.

7. A camera comprising a rear cover part, and a rotatable counter dial having a numerical scale of exposure count indicia to be successively viewed, is characterized in that:

each of said indicia has the same color; and a label on said rear cover part is superimposed to said counter dial and has the same color as said indicia to render the indicia invisible in order to prevent them from being viewed, and includes a viewing portion that is not the same color as said indicia and is arranged to be superimposed successively to said indicia when said counter dial is rotated, whereby said indicia are successively visible in order to permit them to be successively viewed.

8. A camera as recited in claim 7, wherein said label includes eye-readable information, and said counter dial is transparent to permit said information to be visible through the counter dial in order to be read.

* * * * *